April 19, 1949.  W. L. SMITH  2,467,409
AUTOMATIC SLUDGE CONTROL
FOR SEDIMENTATION TANKS
Filed April 18, 1945  4 Sheets-Sheet 1

Inventor
William L. Smith.

By Clarence A. O'Brien
and Harvey B. Jacobson
Attorneys

April 19, 1949.     W. L. SMITH     2,467,409
AUTOMATIC SLUDGE CONTROL
FOR SEDIMENTATION TANKS Filed April 18, 1945     4 Sheets-Sheet 2

Inventor
William L. Smith.

By Clarence A. O'Brien
and Harvey B. Jacobson
Attorneys

April 19, 1949.　　　　W. L. SMITH　　　　2,467,409
AUTOMATIC SLUDGE CONTROL
FOR SEDIMENTATION TANKS Filed April 18, 1945　　　　　　　　　　　4 Sheets-Sheet 4

Inventor
William L. Smith

Patented Apr. 19, 1949

2,467,409

UNITED STATES PATENT OFFICE 2,467,409

AUTOMATIC SLUDGE CONTROL FOR SEDIMENTATION TANKS

William L. Smith, Savannah, Ga.

Application April 18, 1945, Serial No. 588,913

7 Claims. (Cl. 210—55)

This invention relates to sedimentation tanks, to so-called "thickeners" handling turbid liquids and removing granular and other solid material therefrom, and to similar apparatus intended to separate solids especially in the form of thick sludge from the turbid water carrying it.

Various apparatus for performing this function have been constructed and are in practical operation. To make operation continuous certain conditions have to be fulfilled by these apparatus whatever their special construction. The discharge of the apparatus should be made with the lowest moisture content practically obtainable for the particular material handled; but at the same time it should not be of such a low moisture content that it cannot be pumped through pipes or tends to clog the pipe lines. Other conditions are of the same general type. Removal of sludge, for instance, has to take place at the exact moment when it becomes sufficiently thick; it has to take place at a rate which will equal the amount of solids fed in with the turbid liquor during the same period and as the apparatus necessarily works differently with different materials and with differences in the turbidity of the liquid at the start and after several hours or even days, constant supervision and watching of the overflow of the various compartments of the thickened sludge and of other conditions is necessary to effect adjustment of the controls and to maintain continuous and even operations.

The invention has for its object to make the operation as far as possible automatic and to simplify the work of the operator as far as possible. By practical experience it has been found that most changes affect the power necessary for driving the mechanical means for thickening the sludge and that every such apparatus has a very definite capacity for dealing with a certain quantity under certain conditions. All the changes in conditions such as the feed characteristics, the clarity of the overflow, the ratio of solids and moisture in the underflow and the like will affect the power necessary for driving the mechanism in a very definite manner. Mechanisms of this general type are moreover provided with an overload indicator or overload alarm device which indicates to the operator that the safety margin as regards power supply has been reached and that conditions in the apparatus do no longer warrant a continuous operation. This overload alarm device is, as a rule, somehow operated in proportion with the load.

According to the invention, said overload alarm is used, such as it is, to operate in succession means which control the discharge of the apparatus and further means which permit the addition of a high pressure water supply to the discharge pipe. A suitable connection between said overload alarm and the above-mentioned controls practically permits to influence most of the conditions which may establish themselves within the thickener or sedimentation tank during operation, and thereby this connection permits those corrections and will create a tendency to return to the normal conditions. The operation is thus either fully automatic or is one which the operator has to supervise and to adjust only occasionally, thus relieving the operator either fully or almost fully from the task of constant supervision and adjustment.

The invention is described in the following specification with reference to two modifications but it is to be understood that these modifications merely show examples; further modifications do therefore not necessarily constitute a departure from the invention.

In the drawings:

Figure 6 is a longitudinal section through a portion of the driving mechanism showing the driving shaft and its connection with the overload indicator.

Figure 1:
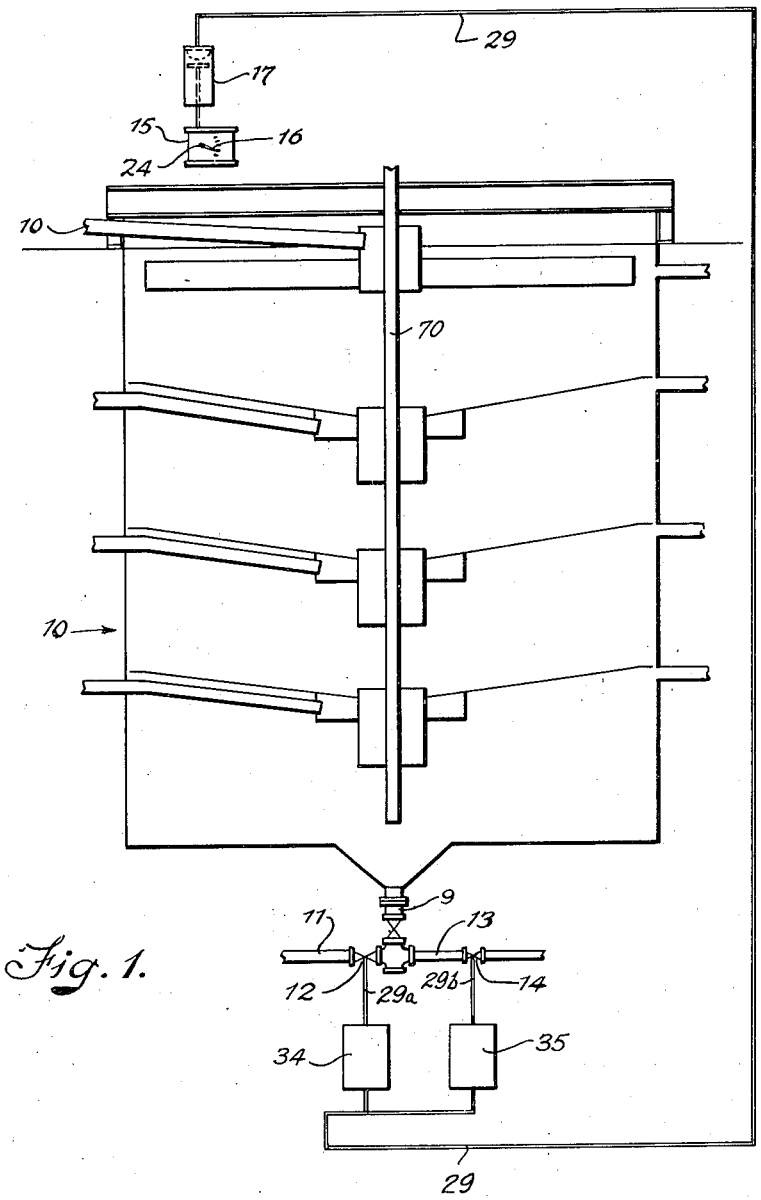
Figure 1 is a diagram showing the general arrangement of the automatic sludge control, the sludge thickener, rake mechanism and the like being merely outlined.

As shown in Figure 1, the sludge thickener, sedimentation apparatus, or the like, is indicated at 10, and may be of any approved type, similar to one of those now in practical use, the constructional details and the special type of thickener used being without influence. In Figures 1 and 4 a three tray four compartment balanced type tray thickener is diagrammatically illustrated comprising a tank 65 supporting the trays 66 by means of which the casing is divided into compartments 67, 67a, 67b, 67c. With the type shown the compartments are operating in parallel and each compartment is provided with a feed pipe 68 with all the feed pipes leading to a weir box 69 where the feed is divided into four parts.

Figure 4:
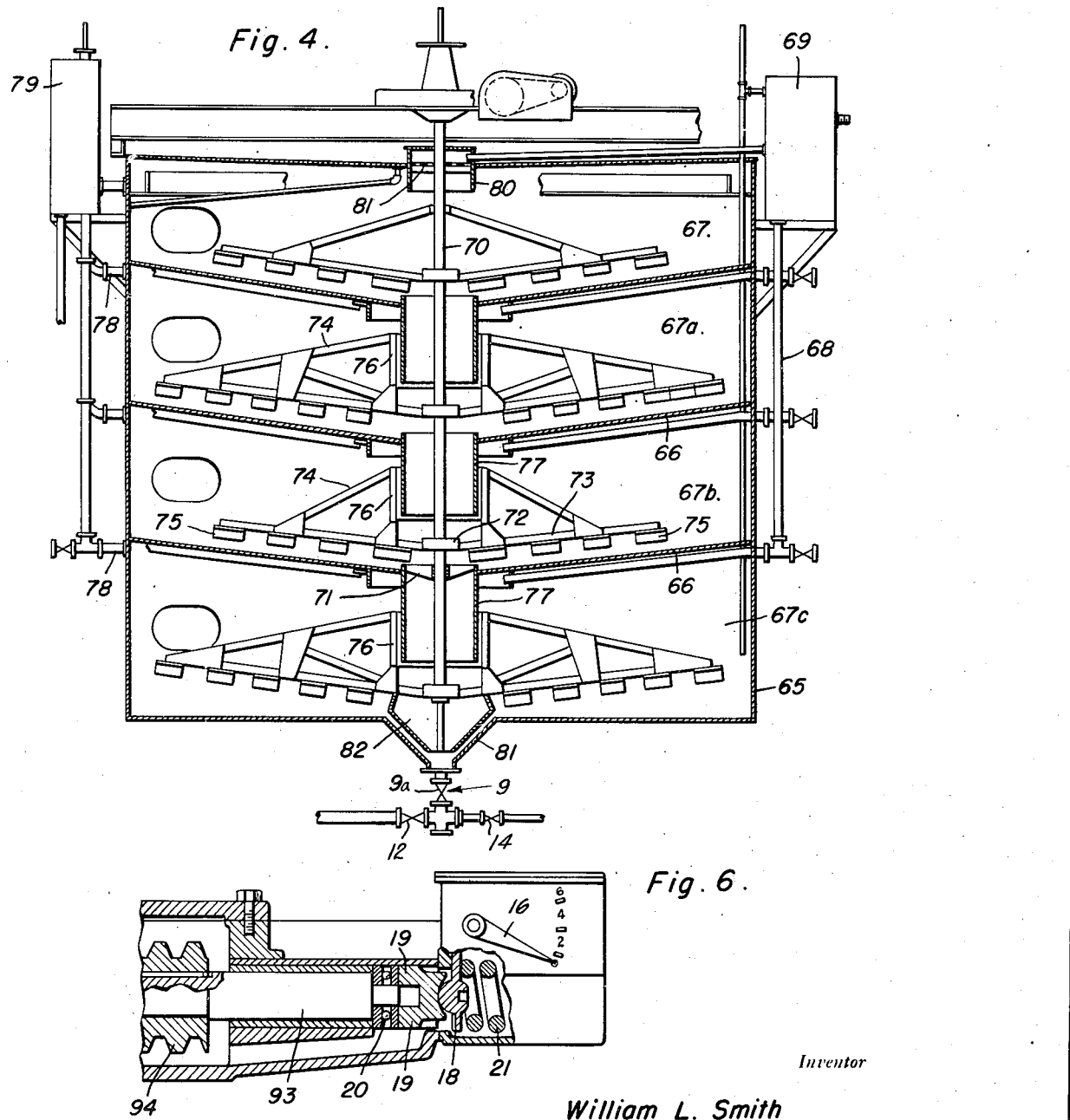
Figure 4 is diagrammatic cross section through a well known three tray, four compartment balanced type tray thickener.

In the center a shaft 70 is located, held in steady bearings and bushings 71 one of which is shown in Figure 4. This central shaft is driven by means of a driving mechanism described below. The shaft is provided with arm spiders 72 carrying arms 73 with blades 75 forming the rakes. The arms are supported by braces 74 mounted on further spiders fixed on cages 76 held on boots 77 fixed to the trays.

Overflow pipes 78 leading from every compartment to overflow boxes 79 are provided in the requisite number. The boots 77 establish communication between the compartments. The top of the tank is provided with a feed well 80 holding a screen 81.

The bottom of the tank is provided with a discharge cone 81 within which scrapers 82 may work. At the end of the discharge cone an assembly holding the discharge valve 9 is mounted.

The feed is divided four ways by means of weir box 69 and each fourth of the feed is fed to each thickener compartment. The overflow pipes 78 are set so that equal volumes of overflow are withdrawn from each compartment. The settled sludge from each compartment passes down to the compartment below by means of the deep central boot 77 which causes the sludge from one compartment to be transferred into the settled sludge in the compartment below without any opportunity for the sludge to be reslurried. The deep central boot 77 on each tray extends down into the sludge on the tray in the compartment below. In this way the mud from each tray passes down through these central boots to the bottom compartment and a seal on each tray is produced which resists any tendency for liquor short circuiting.

The sludge is removed at the conical discharge end 9 where a valve 9a is usually inserted. This end is connected with a discharge pipe 11 leading to a pump (not shown); into this pipe a valve, gate valve or another control member 12 is inserted for regulating the discharge of the thickened sludge from the container 10.

A water pipe 13 is moreover provided by means of which water may be supplied to the discharge end 9 and pipe 11 and a valve 14 in said pipe permits to open and close and to regulate said supply.

It will be obvious, without any further description of the sludge thickener construction and of its mechanical, chemical or other means for effecting the sedimentation of the granular or other solid material or for thickening the consistency of the sediments, that the treatment of the turbid liquid in the sludge thickener or sedimentation tank has to result in a mass of solids with a minimum of moisture content, the latter being, however, still sufficient to permit transportation of the thickened mass through pipes to the place of disposal of the sludge without any danger of clogging.

It will also be obvious that the moisture content of the discharged sludge will be regulated by opening or closing the valve, gate valve or other control member 12; closing of the valve will retard the flow and will, therefore, furnish a thickened sludge while opening of the valve will produce a more fluid condition. If the sludge, however, is too thick to be moved in pipes after the valve has been opened completely, introduction of water under pressure through pipe 13 will supply an additional high pressure water content for the thick sludge which will permit continuous operation and transportation.

It will, therefore, be understood that the valves 12 and 14 have to be operated in succession. If opening of valve 12 to its fullest extent does not cause relief the valve 14 has to be operated and to supply the additional water content necessary for transportation.

Figure 5:
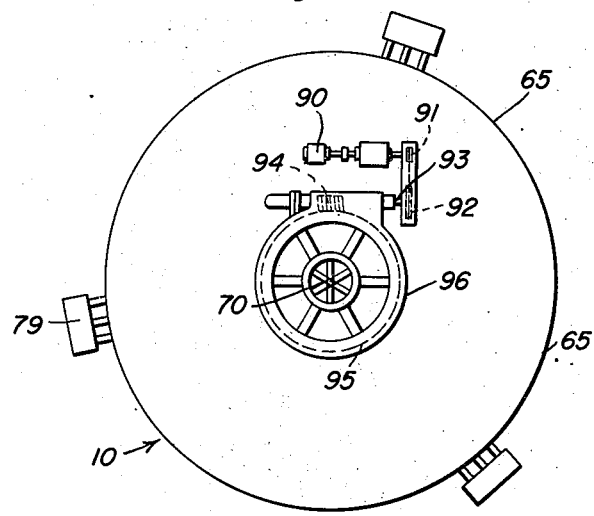
Figure 5 is a plan view showing the driving mechanism.

The sludge thickener is driven by means of the driving means shown in Figure 5 located at the top of the tank 65. The driving motor 90 is connected with a speed reducing gear box driving a shaft on which a sprocket wheel 91 is mounted. The sprocket wheel drives a second sprocket wheel 92 on a shaft 93 carrying a worm 94 which engages a worm wheel 95 mounted on a central shaft. The worm wheel may be surrounded by a gear box 96. The shaft 93 is journaled in an appropriate manner and is axially held by means of a thrust bearing 20. This thrust bearing is resiliently mounted in an axial direction and is held by a thrust block 19 pressing against the thrust plate 18 which is loaded by the strong spring 21. The latter finds its support on a retaining disk held by the casing.

It will be clear from the above description that the load of the rakes will determine the load of the shaft 70, and that the load on this shaft determines the load on the worm wheel. The load on said wheel in its turn determines the axial thrust which is put on the drive shaft 93.

It will also be clear that on account of the resilient mounting of shaft 93 in an axial direction a slight axial movement of the shaft 93 will be the result of every change of the load, but as the axial movement is slight it may be absorbed by the sprocket wheel transmission between the sprocket wheels 91 and 92.

It may here again be emphasized that the entire construction and every detail thereof thus far described is well known and is extensively used in actual practice.

A further well known feature of the sedimentation or thickening apparatus, consists in an overload alarm device. Various methods are known for operating the overload alarm, some being mechanical and some electrical. The particular method employed is not relevant in this case as every method will be able to give results. The best method for registering overloads is the mechanical method now in practical use in many plants according to which the said overload mechanism is connected with the axially movable shaft 93 which when moved by the increasing load on shaft 70 and wheel 93 finally, by means of a mechanical connection, moves the pointer of an indicator and trips an electrical switch when this movement reaches a predetermined limit. As the power necessary to drive the sludge thickener is a factor containing, as it were, the summary of practically all the conditions influencing the operation, it will furnish an indication which permits to gauge accurately the load which is put upon the thickener and the course which the process is taking.

The alarm device 15 is usually mounted at the top of the tank 10 and is indicated diagrammatically by the box containing the alarm switch or other alarm member on the outside of which the pointer 16 is so mounted. Together with the pointer the automatic control device 17 is operated which forms the addition constituting the present invention.

To operate the overload indicator the thrust plate 18 is provided with an arm 22 which moves a lever 23 mounted on a pintle or shaft 24. This shaft carries the pointer 16 on the outside of the box 15 which surrounds the overload alarm device.

The construction of the overload alarm device as shown is known in itself, the members 18, 19, 20, 21, 22, 23, 24 and 16 forming part of a standard alarm device such as in practical use.

The invention consists in the utilization of this known overload indicating or alarm device for the purpose of an automatic control and in the device for establishing and exercising this control. The device 17 according to Figure 2 consists of a push rod 25 associated with the thrust plate 18 by means of a connecting link 26 mounted thereon. The push rod may carry a piston plate 27 acting against a bladder 28 mounted on a fixed base plate 30 by means of an annular angle plate 32 and of rivets 31.

In the center of the base plate a pipe 29 is shown which leads to the space enclosed by the bladder 28.

Figure 7:
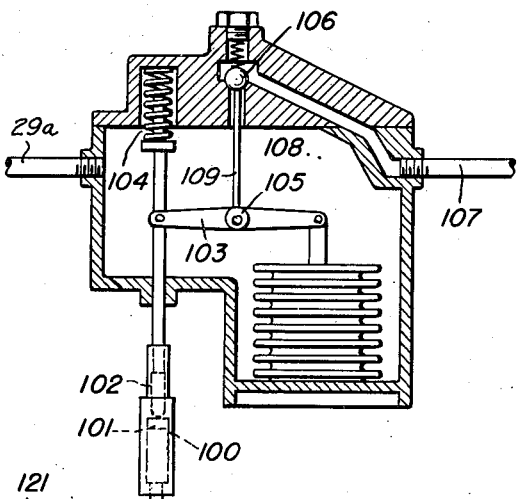
Figure 7 is a diagrammatic sectional view of a known pilot valve.

The general idea underlying the mechanism described consists in producing in the pipe 29 an air pressure which is proportional to the movement of the thrust plate 18 against the spring. The compressed air in the pipe 29 is conducted to a pneumatic relay mechanism 34 and 35 which may be well known in itself. Such a well known example of a mechanism is diagrammatically indicated in Figure 7. The air line 29 leading from bladder 28 is connected with the actuator head 100 which includes a movable piston 101 on which a plunger 102 rests. The plunger is connected with a cam lever 103 moved against the action of a spring 104 and carrying a pilot valve stem 109 by means of a crank or eccentric 105. The valve stem actuates a pilot valve 106. The lever is fulcrumed on a stem supported by a barometric coil which however is only provided for adjustment purposes. An air line 107 supplied with air under pressure from any available source of compressed air leads to the valve 106. The pressure in the chamber 108 behind the valve 106 is therefore governed by the extent to which the valve 106 opens. An air line 29a leads to the valve which is to be operated by the pneumatic device. It is obvious that the position of the valve 106 is adjusted by the plunger 102 the position of which in its turn is determined by the varying air pressure in line 29. The position of the valve 106 controls or regulates the air pressure in the delivery pipe 29a. The pilot valve is therefore a relay which furnishes a varying pressure drawn from a local source of compressed air which is proportional to the variations in an exciting pressure line such as 29. The air pressure as long as it is small actuates the pneumatic relay 34 which operates the discharge pipe valve 12 at the sludge outlet 9. When the valve has been fully opened and the pressure in the pipe 29 still increases the pneumatic relay 35 is operated and the valve 14 of the high pressure water supply 13 is opened. The construction of the pneumatic relay 35 is identical with the construction shown in Figure 7 and merely its adjustment is different.

Figure 8:
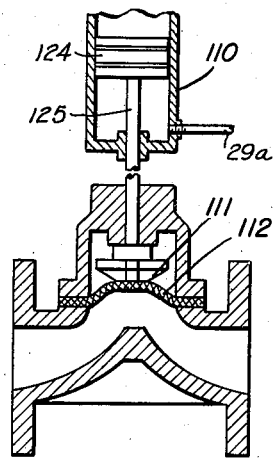
Figure 8 is a diagrammatic sectional view of a known type of diaphragm valve.

The valve 13 may be of any known type provided with a diaphragm. A widely used type of valves suitable for sludge and viscous liquids is illustrated diagrammatically in Figure 8. This valve comprises a sliding stem 125 which is operated by a piston 124 moving in an air cylinder 110 and which acts in a compressor disk 111 operating the diaphragm 112. Air pressure maintained on the upper side of the piston 124 or a suitable weight holds the diaphragm and the compressor disk 111 in a position in which the passage of the valve is closed. When the pilot 35 starts to operate and when therefore air pressure is admitted to line 29b which opens into the space below the piston 124, the latter is lifted and the passage through the valve is opened. It is however to be understood that any air operated valve of a construction suitable for turbid viscous and corrosive liquids or for solids suspended in liquids may be used, the illustration of a suitable known type being merely in the nature of an example.

Figure 3:
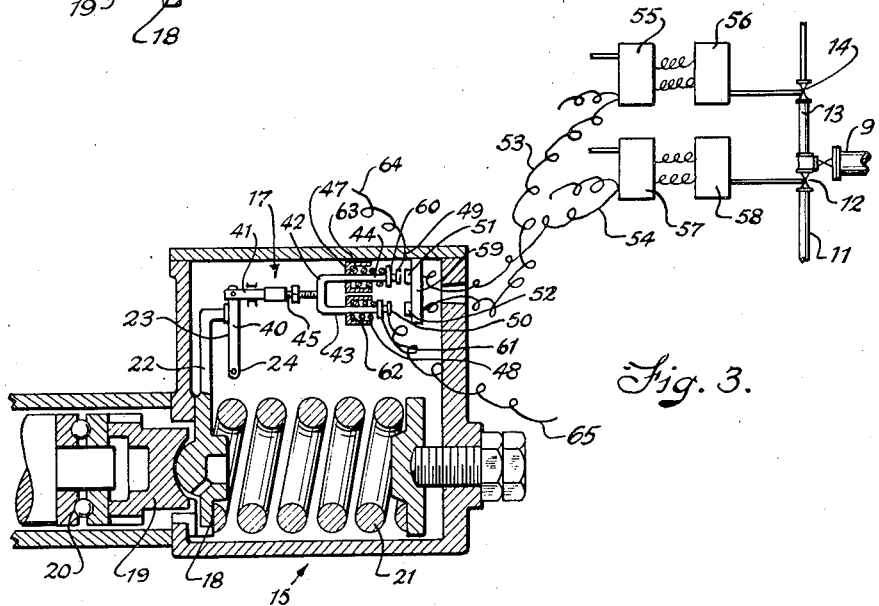
Figure 3 is a sectional elevational view of the parts of an overload alarm arrangement connected with a modified embodiment of the present invention.

The modification of the invention illustrated in Figure 3 shows an electro-mechanical device performing the same function.

As seen in this figure, the thrust plate 18 pressing against the spring 21 and performing a stroke proportional to the driving power consumed by the sludge thickener, turns shaft 24 by means of push lever 22 and the said shaft rotates link 40 and moves link 41. The latter carries a fork 42 with two legs 43, 44 of unequal length. The said fork is adjustably mounted on the link 41 by means of a screw threaded part 45.

The two legs 43, 44 pass through cups 47, 48 and carry pressure disks 60, 61. Between said disks and the cups compression springs 62, 63 are inserted which have the tendency to move the legs outwardly and therefore hold the parts of the mechanism in mutual operative contact with each other.

Each leg 43, 44 carries a contact plate 49, 50 respectively which is connected with a conductor 64, 65 and cooperates with a fixed contact 51, 52 mounted on a plate 59 which is of insulating material and is fixedly mounted in the box 15.

Contact 50 on the shorter leg 43 cooperating with contact 52 and conductor 53 leading from it is connected with the relay 55 which operates the electric valve closing mechanism 56, which in its turn operates the valve 14 of the high pressure water pipe 13. Contact 49 on the longer leg 44 cooperates with contact 51 and by means of conductor 54 operates relay mechanism 57 which in its turn operates the valve closing mechanism 58 which controls valve 12 on the discharge pipe 11.

Figure 9:
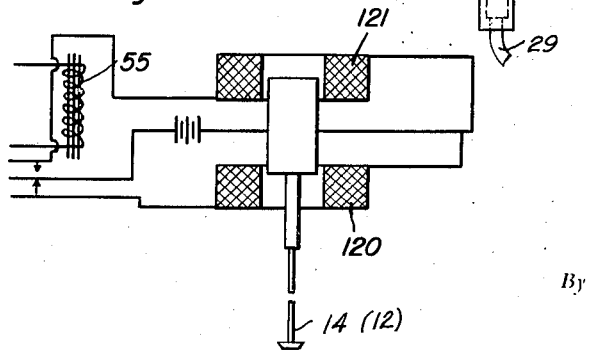
Figure 9 is a diagrammatic view of a well known type of solenoid.

The electrically controlled valve closing mechanism 56, 58 is again a well known mechanism. Figure 9 illustrates diagrammatically a well known construction of this type with two solenoids acting on a core in two opposite directions. The valve 14 (12) is operated by the core of the solenoid. A solenoid 120 closing the valve is normally energized as long as the relay 55 is not closed. When the relay closes its contacts, the solenoid 120 is de-energized and solenoid 121 is energized, starting to open the valve. If the overload continues after the valve 14 has been opened completely the contacts 52 and 50 close the circuit of relay 57. The solenoid, corresponding to solenoid 121 in the relays 58 now starts to operate and open the valve.

The solenoid valves of this type are usually less simple in construction and include varying resistances and other units not shown in the figure. The operation, however, does not differ in principle from the operation described.

Figure 2:
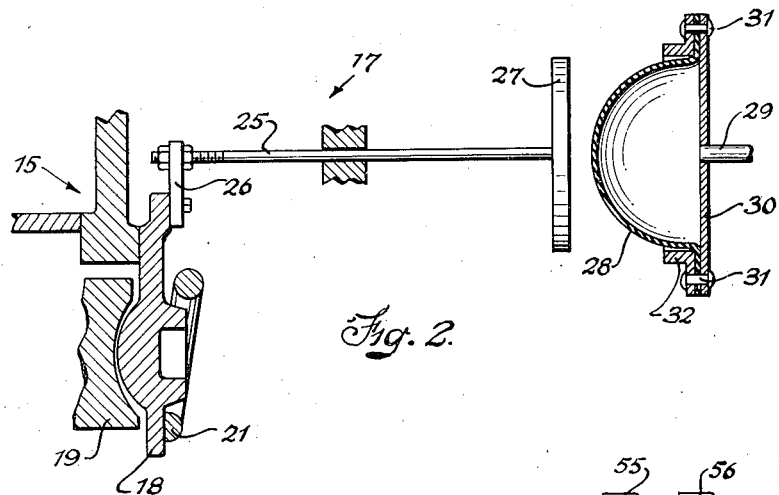
Figure 2 is a sectional elevational view of that part of an overload alarm arrangement with which the present invention is connected.

The operation of the device is similar or identical with that described in connection with the modification shown in Figure 2.

When the load on the device increases—usually on account of obstruction due to thickening of the sludge—the thrust plate 18 is moved inwardly to the right in Figure 3 and lever 23 and shaft 24 are turned.

Turning of shaft 24 in a clockwise direction pushes rod 41 and the fork 42 towards the right in Figure 3. First contact 49 will come into engagement with contact 51 and relay 54 will be operated and will open valve 12. When valve 12 has been opened completely and the strain on the apparatus still increases the shorter leg contact 50 will come into engagement with contact 52, whereby relay 55 and the valve 14 of the water pipe 13 is opened.

It will be clearly understood by the expert that other means may be made to operate in a similar manner and that the introduction of such means will still utilize the ideas underlying the present invention.

I claim:

1. An automatic sludge control system for conventional sedimentation apparatus provided with means for introducing a mixture of liquid and solids, with means for withdrawing the clarified liquids, with an outlet for delivering the sludge, with means for scraping the sludge to the outlet, with a driving mechanism for the last named scraping means, including a driving shaft, with a sludge discharge pipe connected with the outlet, with a regulating valve therein, and with an overload indicator including a movable member operated by the driving shaft, said system comprising a pressure pipe for injecting water into the discharge pipe, a control valve within said pressure pipe, means for operating said control valve, means for operating the regulating valve in the sludge discharge pipe, means operated by the movable member of the overload indicator for opening the regulating valve at a predetermined load in order to reduce the load and means operated upon continued prevailing of an overload after opening of the regulating valve for opening the control valve in the water carrying pressure pipe.

2. An automatic sludge control system for conventional sedimentation apparatus provided with means for introducing a mixture of liquid and solids, with means for withdrawing the clarified liquids, with an outlet for delivering the sludge, with means for scraping the sludge to the outlet, with a driving mechanism for the last named scraping means, including a driving shaft with a sludge discharge pipe connected with the outlet, with a regulating valve therein, and with an overload indicator including a movable member operated by the driving shaft, said system comprising a pressure pipe for injecting water into the discharge pipe, a control valve in said pressure pipe, means for operating said control valve, means controlled by the movable member of the overload indicator for controlling the flow of sludge and liquid through said discharge pipe and means operated by the movable member of the overload indicator for controlling the injection of water from the pressure pipe into the sludge discharge pipe.

3. An automatic sludge control system for conventional sedimentation apparatus, provided with means for introducing a mixture of liquid and solids, with means for withdrawing the clarified liquids, with an outlet for delivering the sludge, with means for scraping the sludge to the outlet, with a driving mechanism for the last named scraping means, including a driving shaft with a sludge discharge pipe connected with the outlet, with a regulating valve therein, and with an overload indicator including a movable member operated by the driving shaft, said system comprising a high pressure water supply pipe connected with the sludge discharge pipe for injecting water into the latter, a valve controlling the injection of water into said sludge discharge pipe, a fluid pressure system, means operated by the movable member of the overload indicator for producing a fluid pressure within said fluid pressure system, air operated means for actuating the valve in said sludge discharge pipe, a conventional pneumatic relay unit, connected with said fluid pressure system, and adjusted for operation at a given pressure within said system, corresponding to a predetermined load, said pneumatic relay being connected with said air operated valve actuating means, a further conventional pneumatic relay unit operated by the fluid pressure system and provided with means for operating the controlling valve in the high pressure water supply pipe, said further relay being adjusted for operation at a continuing pressure of the fluid pressure system higher than the pressure at which the first named pneumatic relay unit is operated.

4. An automatic sludge control mechanism for conventional sedimentation apparatus provided with means for introducing a mixture of liquid and solids, with means for withdrawing the clarified liquids, with an outlet for delivering the sludge, with means for scraping the sludge to the outlet, with a driving mechanism for the last named scraping means, including a driving shaft, with a sludge discharge pipe connected with the outlet, with a regulating valve therein, and with an overload indicator including a movable member operated by the driving shaft, comprising a high pressure water pipe connected with the sludge discharge pipe for injecting water into the latter, a valve for controlling the injection of water, a bladder adapted to compress a fluid enclosed therein, a compressor disk, operated by the movable member of the overload indicator, a pipe leading from the bladder, a conventional pneumatic relay unit, connected with the pipe leading from the bladder, said unit being adjusted for a definite pressure produced by compression of the bladder and corresponding to a predetermined load, air operated means for actuating the valve in said discharge pipe, connected with the said pneumatic relay unit, a further conventional pneumatic relay unit, connected with the pipe leading from the bladder, air operated means for actuating the controlling valve in the high pressure water supply pipe, said further relay being adjusted for operation at a continued pressure in the bladder higher than the pressure at which the first named pneumatic relay unit is operated.

5. An automatic sludge control mechanism for conventional sedimentation apparatus provided with means for introducing a mixture of liquid and solids, with means for withdrawing the clarified liquids, with an outlet for delivering the sludge, with means for scraping the sludge to the outlet, with a driving mechanism for the last named scraping means, including a driving shaft, with a sludge discharge pipe connected with the outlet, with a regulating valve therein, and with an overload indicator including a movable member operated by the driving shaft, comprising a high pressure water pipe connected with the sludge discharge pipe for injecting water into the latter, a valve for controlling the injection of water, contact means operated by the movable member of the overload indicator, including fixed contacts and two movable contacts operative in succession, upon movement of the movable member of the overload indicator, circuits closed by said contacts, electrically controlled operative means for the operation of the regulating valve in the sludge discharge pipe, electrically controlled means for the operation of the control valve in the high pressure discharge pipe, controlling the injection of water into the sludge pipe, operative circuits for the two last named means, said circuits being controlled by the movable contacts operative in succession upon movement of the movable member of the overload indicator.

6. An automatic sludge control mechanism as specified in claim 5, wherein the contact carrier consists of a two legged member with legs of different lengths.

7. An automatic sludge control system for conventional sedimentation apparatus provided with means for introducing a mixture of liquid and solids, with means for withdrawing the clarified liquids, with an outlet for delivering the sludge, with means for scraping the sludge to the outlet, with a driving mechanism for the last named scraping means, including a driving shaft with a sludge discharge pipe connected with the outlet, with a regulating valve therein, and with an overload indicator including a movable member operated by the driving shaft, said system comprising an automatic valve actuating mechanism for the regulating valve of the sludge discharge pipe, means for operating said automatic mechanism controlled by the movable overload indicator member, a water pipe connected with and discharging into said sludge discharge pipe, a valve controlling the discharge of water from said pipe into the sludge discharge pipe of the sedimentation apparatus, an automatic valve actuating mechanism connected with said water discharge controlling valve and means to operate said valve actuating mechanism controlled by said movable overload indicator member.

WILLIAM L. SMITH.

REFERENCES CITED

The following references are of record in the file of this patent:

UNITED STATES PATENTS

| Number | Name | Date |
|---|---|---|
| 353,775 | Booraem | Dec. 7, 1886 |
| 1,071,784 | Nutter | Sept. 2, 1913 |
| 1,140,131 | Dorr | May 18, 1915 |
| 1,227,107 | Blomfield | May 22, 917 |
| 1,478,674 | Pettis | Dec. 25, 1923 |
| 1,833,390 | Carter | Nov. 24, 1931 |
| 2,126,884 | Hardinge | Aug. 16, 1938 |
| 2,141,371 | Bach | Dec. 27, 1938 |

FOREIGN PATENTS

| Number | Country | Date |
|---|---|---|
| 4,748 | Australia | July 14, 1932 |